(12) United States Patent
Prieto Padilla et al.

(10) Patent No.: US 12,498,178 B2
(45) Date of Patent: Dec. 16, 2025

(54) EVOLUTIVE PRECOOLER

(71) Applicant: Airbus Operations S.L.U., Getafe (ES)

(72) Inventors: Juan Tomás Prieto Padilla, Getafe (ES); Diego Barrón Vega, Getafe (ES)

(73) Assignee: Airbus Operations S.L.U., Getafe (ES)

( * ) Notice: Subject to any disclaimer, the term of this patent is extended or adjusted under 35 U.S.C. 154(b) by 106 days.

(21) Appl. No.: 18/081,174

(22) Filed: Dec. 14, 2022

(65) Prior Publication Data

US 2023/0194185 A1    Jun. 22, 2023

(30) Foreign Application Priority Data

Dec. 16, 2021  (EP) .................................. 21383148

(51) Int. Cl.
*F28D 1/02*    (2006.01)
*B64D 13/08*   (2006.01)
*F02C 7/18*    (2006.01)
*F28D 9/00*    (2006.01)
*F28D 9/02*    (2006.01)
(Continued)

(52) U.S. Cl.
CPC ............. *F28D 9/0062* (2013.01); *F28D 9/02* (2013.01); *F28D 21/00* (2013.01); *F28D 2021/0021* (2013.01)

(58) Field of Classification Search
CPC . B64D 13/08; F02C 7/185; F28D 2021/0021; F28D 9/02; F28D 9/0081; F28D 9/0006; F28D 2001/0273; F28D 2001/0266; F28F 9/0263; F28F 3/12; F28F 3/005
See application file for complete search history.

(56) References Cited

U.S. PATENT DOCUMENTS 10,852,028 B2    12/2020   Hirsch et al.
2006/0225867 A1*  10/2006  Park ...................... F28F 9/0263
                                                          165/170
(Continued)

FOREIGN PATENT DOCUMENTS

EP      2767777 A1    8/2014
EP      3587981 A1    1/2020

OTHER PUBLICATIONS

European Search Report dated May 6, 2022; priority document.

*Primary Examiner* — Frantz F Jules
*Assistant Examiner* — Jason N Thompson
(74) *Attorney, Agent, or Firm* — Greer, Burns & Crain, Ltd.

(57) ABSTRACT

An aircraft heat exchanger arranged longitudinally and including a casing with an inner chamber configured so that coolant flows longitudinally from an inlet to an outlet, a plurality of laterally spaced longitudinally extending inner chamber plates, and a plurality of channels defined between contiguous plates. Each plate includes a leading edge oriented towards the inlet and configured to divert coolant towards the channels. A plurality of the plates include an inner hollow area configured to conduct a flow of hot bleed air therethrough. Leading edges of a first group of plates are arranged in a stepped pattern. A gap defined between the first group of plates and a first casing lateral wall establishes a fluid coolant communication through the first group of plates between the casing inlet and outlet. The lateral distance between each leading edge of the first group of plates and the first lateral wall decreases longitudinally.

18 Claims, 6 Drawing Sheets

(51) Int. Cl.
*F28D 21/00* (2006.01)
*F28F 3/00* (2006.01)
*F28F 3/12* (2006.01)

(56) References Cited

U.S. PATENT DOCUMENTS

| | | | |
|---|---|---|---|
| 2008/0230651 A1* | 9/2008 | Porte | F28D 7/1669 |
| | | | 60/785 |
| 2009/0236083 A1* | 9/2009 | Brand | F28F 3/048 |
| | | | 165/181 |
| 2019/0204010 A1* | 7/2019 | Breeze-Stringfellow | |
| | | | F28F 13/08 |
| 2019/0390915 A1 | 12/2019 | St. Rock et al. | |
| 2021/0041188 A1* | 2/2021 | Walsh | F28F 9/0268 |
| 2021/0163124 A1* | 6/2021 | Pisani | F02C 7/14 |
| 2021/0318071 A1* | 10/2021 | Hart | F28D 1/0316 |

\* cited by examiner

EVOLUTIVE PRECOOLER

CROSS-REFERENCES TO RELATED APPLICATIONS

This application claims the benefit of the European patent application No. 21383148.0 filed on Dec. 16, 2021, the entire disclosures of which are incorporated herein by way of reference.

FIELD OF THE INVENTION

The present invention belongs to the field of heat exchangers, namely to precooler arrangements installed in the powerplant of an aircraft. More in particular, it relates to specific architectures and integration of precoolers in volumes bounded and constrained by the pylon holding the engine to the wing of the aircraft.

BACKGROUND OF THE INVENTION

In civil aircraft, air "bleed" is used on many aircraft systems because it represents a reliable and easily available source of power. Examples of tasks that are implemented and performed by using bleed air from the compressor section of an aero engine such as turbofans, turbojets or turboprops, or from the Auxiliary Power Unit (APU) are the following:

pressurization/air conditioning of the aircraft cabin by supplying air to the environmental control system;
engine start;
keeping critical parts ice-free by providing hot air to the wing and engine anti-ice systems; and
water system pressurization.

A bleed air system typically uses a network of pipes or ducts, valves and regulators to route medium to high pressure air from the bleeding section to the particular locations/systems within the aircraft which need bleed air to carry out any of the above listed tasks.

When used for cabin pressurization/air conditioning, the bleed air diverted from the compressor section of the engine must first be cooled (as it may exit the compressor at temperatures up to even more than 500° C.), prior to being introduced into the aircraft cabin, by passing it through a 'cooling circuit' which may comprise an air-to-air heat exchanger (i.e., precooler) cooled by air extracted from the bypass stream flowing through the engine fan duct aft of the outlet guide vanes of the engine nacelle.

Existing 'precooler' designs conceive the architecture of the heat exchanging elements arranged according to a parallelepiped shape which jeopardizes flexibility in terms of integration with the rest of surrounding elements, such as the pylon.

SUMMARY OF THE INVENTION

The present invention provides a solution to the aforementioned problems by proposing a heat exchanger, a powerplant arrangement and an aircraft.

According to a first inventive aspect, the invention provides a heat exchanger for an aircraft, the heat exchanger arranged along a longitudinal direction X-X' and comprising:

a casing defining an inner chamber and comprising an inlet, an outlet and a first and second lateral walls opposite each other and extending between the inlet and the outlet; the casing being configured to be in fluid communication with a source of incident flow of coolant through the inlet so that in an operative mode of the heat exchanger a flow of coolant flows through the inner chamber from the inlet to the outlet following the longitudinal direction X-X';

a plurality of plates housed in the inner chamber of the casing extending substantially parallel to the longitudinal direction X-X', each of the plurality of plates being spaced from each other between the first lateral wall and the second lateral wall along a transverse direction Y-Y' perpendicular to the longitudinal direction X-X'; and a plurality of channels defined between contiguous plates;

wherein each of the plurality of plates comprises a leading edge oriented towards the inlet and configured for diverting the incident flow of coolant towards the contiguous channels;

at least a plurality of the plates comprise an inner hollow area configured to be in fluidic communication with a source of hot bleed air and to conduct a flow of the hot bleed air therethrough in an operative mode of the heat exchanger;

the leading edges of a first group of plates are arranged according to a stepped pattern, such that each leading edge is arranged in a downstream position according to the longitudinal direction X-X' with respect to the inlet and to the leading edge of a contiguous plate;

the heat exchanger further comprises a first gap defined between the first group of plates and the first lateral wall of the casing, so that the first gap allows to stablish a fluid communication of coolant through the first group of plates between the inlet and the outlet of the casing; and the distance between each leading edge of the first group of plates and the first lateral wall according to the transverse direction Y-Y' decreases along the longitudinal direction X-X'.

The present heat exchanger comprises a casing that partially encloses an inner chamber. This casing comprises two lateral walls opposite each other and also an upper and bottom wall. Further, the casing comprises an inlet and an outlet wherein both corresponds to the inlet and outlet of the heat exchanger. Specifically, the inlet is suitable to be connected to a source of coolant through which an incident coolant flow goes into the heat exchanger towards the outside of the casing.

The disposition of the heat exchanger along the direction X-X' implies and should be understood as that the incident flow of coolant that is provided into the heat exchanger to evacuate heat travels essentially parallel to the direction X-X'. That is, it will be understood that the coolant flow flows according to the longitudinal direction X-X'. Likewise, the main elements of the heat exchanger, that is, the plurality of plates, are arranged essentially parallel to the direction X-X', to favor the movement of the incident flow of coolant, as well as to maximize the area of contact with the surfaces intended for carrying out the heat-exchanging performance, that is, the evacuation of heat of the hot bleed air that flows within the plates through their respective inner hollow areas.

The plurality of plates comprised in the heat exchanger, that is, housed in the inner chamber of the casing, extend along the longitudinal direction X-X'. Furthermore, each plate is spaced from one another along a transverse direction Y-Y' between the two lateral walls of the casing. In particular, the transverse direction Y-Y' is understood as the direction perpendicular to the longitudinal direction X-X' from one of the lateral walls to the other lateral wall of the casing.

In an embodiment, the plurality of plates are substantially flat.

Between contiguous plates, channels are defined in the inner chamber of the casing. These channels go through a portion of the inner chamber along the longitudinal direction X-X' from an entry area defined between contiguous plates to a corresponding outflow area downstream of the flow path followed through the channels, according to the longitudinal direction X-X'.

Each plate comprises a leading edge oriented towards the inlet for diverting the incident coolant flow towards the contiguous channels. The leading edge is the portion of the plate that first comes into contact with the incoming flow of coolant. Furthermore, at a least some plates comprise an inner hollow area through which hot bleed air passes. These inner hollow areas are suitable to be connected to a source of hot bleed air.

During operation (in an operative mode of the heat exchanger), the coolant accesses the inner chamber flowing therethrough, parallel to the longitudinal direction X-X', from the inlet to the outlet, bathing both lateral walls of the casing and all the plates arranged inside the inner chamber. This coolant flows through the plurality of channels after being diverted at the entry areas of the channels by the leading edges of the plurality of plates exposed to the incident stream of coolant. Heat transfer between the hot bleed air flowing within the plates and the coolant passing through the plurality of channels is performed.

In particular, a substantially perpendicular cross-flow is established between the flow of coolant and the hot bleed air flowing within the plates, which can be high pressure hot air bled from the core engine compressor. Thus, the flow of coolant flowing through the channels contacts the plates heated by the thermal energy of the hot bleed air, facilitating the heat exchanging process, lowering the temperature of the hot bleed air inside the plates to reasonable levels to be used in a variety of tasks on the aircraft. One such task being passenger cabin cooling, wherein the air supplied for cooling the passenger cabin must be first precooled by a heat exchanger and then finally cooled by an air conditioning system.

In order to allow the heat exchanger of the invention to adapt to more complex geometries than the conventional rectangular or parallelepiped geometry of current heat exchangers, and thus be able to take advantage of most of the available space in the place where it is to be installed, a first group of plates is arranged according to a stepped pattern. Such that each leading edge is arranged in a downstream position according to the longitudinal direction X-X' with respect to the inlet and to the leading edge of a contiguous plate.

In other words, the leading edge of each plate belonging to the first group of plates is arranged in a forward location according to the longitudinal direction X-X', that is, further away from the inlet and closer to the outlet, with respect to the leading edge of a contiguous plate. According to the stepped pattern, and along the longitudinal direction X-X', the channels formed between the plates of this first group of plates gradually decrease in length. As interpreted directly from the geometric relation established between the sizes (parallel plates and channels progressively shorter) of the plates belonging to the first group of plates, the first group of plates shall include a plate located at one of the two lateral ends of the arrangement of plates.

In other words, the first group of plates includes one of the two plates located at opposite ends of the set of plates and between which all the other plates are arranged, as well as a plurality of adjacent parts. In this regard, it should be understood that the first group of plates is exposed, facing or oriented towards one of the lateral walls (i.e., the first lateral wall) of the casing, between which an empty space, gap, or region free of plates is defined, for allowing the pass of coolant in its path from the inlet to the outlet.

As aforementioned, in order to properly feed the progressively shorter channels of the first group of plates with the coolant flowing inside of the inner chamber, a first gap or region free of plates is defined between the first group of plates and the lateral contiguous wall, that is, the first lateral wall to which the first group of plates is exposed (i.e., facing). Specifically, the incoming coolant meets this first gap and passes through it until the coolant reaches each channel defined between the plates of the first group of plates respectively and goes through it towards the outlet of the heat exchanger.

The first gap narrows along the longitudinal direction X-X'. In other words, the distance between each leading edge of the first group of plates and the first lateral wall according to the transverse direction Y-Y' decreases along the longitudinal direction X-X'. In this sense, the pressure gradient derived from the convergent geometry favors the flow of the coolant through the progressively shorter channels of the first group of plates along the direction X-X'. That is, the arrangement of plates of the first group, progressively shorter according to the longitudinal direction X-X', and the first lateral wall of the casing converge up to a point wide enough to still permit the flow of coolant towards the outlet of the casing.

Advantageously, the heat exchanger of the invention provided with a first group of plates defining progressively shorter channels, the channels fed by a tapering first gap or region free of plates located between the first group of plates and the first lateral wall, allows taking advantage of most of the available space for a given environment where the heat exchanger is intended to be installed.

Accordingly, the heat exchanger of the invention permits cooling-down higher amounts of heat while having a reduced temperature of the flow of coolant at the outlet of the casing compared to conventional heat exchangers with a parallelepiped geometry.

In an embodiment, the leading edges of a second group of plates are arranged according to a stepped pattern as for the first group of plates;

the heat exchanger further comprises a second gap defined between the second group of plates and the second lateral wall, so that the second gap allows to establish a fluid communication of coolant through the second group of plates between the inlet and the outlet of the casing; and the distance between each leading edge of the second group of plates to the second lateral wall according to the transverse direction Y-Y' decreases along the longitudinal direction X-X'.

The incoming flow of coolant not only finds the first gap but also a second gap free of plates. That is, the inner chamber of the casing is configured with a plurality of plates arranged so that there are a first and a second gap defined between the lateral walls of the casing and the plates placed in the casing. More specifically, a first gap defined between the first group of plates and the first lateral wall, and a second gap defined between the second group of plates and the second lateral wall. Advantageously, the thermal efficiency of the heat exchanger is increased.

In an embodiment, a third group of plates is arranged such that their leading edges are aligned with each other according to the transverse direction Y-Y', and wherein the first and second group of plates are arranged, respectively, on opposite sides of the third group of plates.

In an embodiment, the leading edges of the plates of the first and/or second group are arranged with their suction sides oriented towards the contiguous first or second gap, the leading edges being preferably NACA 4311 airfoils; and/or the leading edges of the plates of the third group are preferably Eppler E475 airfoils.

The arrangement of the leading edges, with the suction side oriented towards the corresponding lateral wall of the casing that they are facing implies that the suction side is also facing towards the contiguous plate of shorter length and, therefore, the pressure side of the leading edge is facing towards the contiguous longer plate. More in particular, the suction side of the leading edges of the first group of plates are oriented towards the first gap and thus the first lateral wall of the casing. Also, the suction side of the leading edges of the second group of plates are oriented towards the second gap and thus the second lateral wall of the casing.

Advantageously, this arrangement of the leading edges favors the cascade flow through successive progressively shorter channels (defined by the plates of the first and/or second group of plates) along the longitudinal direction X-X', minimizing the pressure drop in the entrance area of the channels involved, and accommodating the flow of coolant in the region free of plates that is located between the leading edges and the lateral wall they are facing. Therefore, the overall feeding process of the channels is improved.

In an embodiment, the first and the second lateral walls of the casing taper outwards from the inlet and the outlet, so that the casing comprises a trapezoidal configuration.

Advantageously, an embodiment of a heat exchanger comprising a casing with a trapezoidal configuration can be installed, for example, in a bay of a pylon shaped with a corresponding trapezoidal geometry, allowing to cool-down higher amounts of heat in the same environment with respect to a traditional rectangular geometry.

In an embodiment, at least one of the first or second lateral walls of the casing is substantially flat and forms a first angle $\beta$ with the longitudinal direction X-X';
a plurality of the leading edges of the first or second group of plates adjacent to the corresponding first or second lateral wall are arranged bounded by a substantially flat plane ($\Phi$); and
the plane ($\Phi$) forms an angle $\alpha$ with the longitudinal direction X-X'; and
wherein $\alpha$ is greater than $\beta$.

Advantageously, the gap defined between the first and/or second group of plates and the contiguous lateral wall allows an optimal process of feeding the coolant to all the plates (i.e., the progressively shorter channels) of the corresponding group of plates.

In an embodiment, a plurality of the leading edges, of the first group of plates and/or a plurality of the leading edges of the second group of plates, adjacent to the third group of plates, are arranged bounded by a cylindrical surface, respectively.

The feature that the elements are bounded, or limited, by a geometric entity such as a plane or cylindrical surface must be understood in the sense of a reference or condition that the leading edges must meet with respect to their relative position within the heat exchanger. That is, the plane or cylindrical surface are virtual geometric references which do not correspond to real elements or features that has physical entity within the heat exchanger.

In the particular case of the cylindrical surface, it is a surface generated by the movement of a generatrix along a directrix, wherein all the positions of the generatrix describing the surface in its movement on the generatrix are parallel.

The condition established by this embodiment, therefore, must be understood as that all the leading edges are arranged in such a way that a cylindrical surface, preferably a conical surface, would rest on the plurality of leading edges, being tangent to all of them at the same time.

Advantageously, the plurality of leading edges bounded by a cylindrical surface contribute to smoothing the aerodynamic transition between the third group of plates and the first and/or second group of plates, improving the feed process of the involved channels and minimizing the pressure drop thereby.

Regarding the substantially flat plane ($\varphi$), and the angles '$\alpha$' and $\beta$, a compromise is needed between the volume of the region free of plates defined between the substantially flat plane ($\varphi$) and the lateral wall to which the group of plates bounded by the substantially flat plane ($\varphi$) is facing, and the volume occupied by the third group of plates. The wider the region free of plates is, the better the channels belonging to the group (first or second) of plates facing the region (which are progressively shorter along the longitudinal direction X-X'), will be fed. However, for a given size of a heat exchanger, the region occupied by the third group of plates will be thinner, that is, the central part of the heat exchanger where the main heat-exchanging performance is carried out. In a preferred embodiment the angle $\beta$ is about 11.7 degrees, and the angle $\alpha$ is one selected among the following values: 12.5, 15 and 17.5 degrees.

According to the preferred embodiment, the difference between the angles ($\alpha-\beta$) is about 5.8, 3.3 or 1.3 degrees. Advantageously, the particular differences between angles provide an optimal relation of flow adjustment through the first and/or second gap and into the progressively shorter channels of the corresponding first and/or second group of plates, allowing to maintain an optimal relation between the volume of the inner chamber occupied by the group of plates and the flow going through the corresponding channels. For example, in a heat exchanger where lower flows are provided, the difference between the angles ($\alpha-\beta$) will be lower.

In an embodiment, at least one of the channels comprises a plurality of fins attached by their respective side edges to two contiguous plates, wherein the fins extend substantially parallel to the longitudinal direction X-X' through the channels; for each channel the fins are spaced from one another according to a direction perpendicular to the longitudinal direction X-X' and transversal direction Y-Y' and are arranged essentially parallel to each other.

The fins define a plurality of sub-channels along each channel for contributing to guiding the flow of coolant therethrough. Specifically, the fins are spaced from one another along a direction that is perpendicular to both longitudinal direction X-X' and transverse direction Y-Y'.

In an embodiment, the fins are shaped with an undulating profile along the longitudinal direction X-X'.

In addition to the provision of the fins which divide the channels into a plurality of sub-channels, the undulating geometry of the fins advantageously allows to regard the sub-channels as corrugated tubes which contribute to improving the heat-exchanging performance.

In particular, the heat-exchanging performance is improved by the capability of the corrugations (i.e., undulations) of the fins to originate three heat transfer mechanisms such as secondary flow formation, developing boundary layer and intensifying turbulent intensity of coolant fluid flow.

With respect to the turbulent flow, the principal difference compared to laminar flow, as far as heat transfer is concerned, is the generation of a mechanism of heat transfer in the radial and azimuthal directions, which provides much better transfer of energy across the flow at a given axial position. In laminar flow, conduction is typically the only mechanism that operates in the transverse directions.

In an embodiment, the ratio between the width of the fins and the width of each of the plurality of plates according to the transverse direction Y-Y' is one selected in the range between 1.5 and 2.5, preferably 2.

Advantageously, that range of values, and in particular the value of 2, of the ratio between the width of the fins and the width of each of the plurality of plates provides the optimal relationship between the pressure drop and the necessary effective area for the heat-exchanging performance.

In an embodiment, the inner hollow area of at least one plate comprises inside a plurality of walls spaced from one another along the longitudinal direction X-X' from the leading edge of the plates towards the outlet of the casing, a plurality of inner hollow ducts being defined thereby.

In an embodiment, the casing further comprises a manifold configured for establishing a fluidic communication with a source of air bled from the bypass stream flowing through the engine fan duct for using the air as coolant in an operative mode of the heat exchanger.

In a second inventive aspect, the invention also provides an aircraft powerplant comprising an engine, a pylon configured for coupling the engine to the wing of an aircraft and a heat exchanger according to the first inventive aspect, wherein the heat exchanger is arranged in a bay of the pylon shaped with a trapezoidal geometry.

Pylons hold the engine on the wing, provide a path for all of the engine systems to connect, and include the aerodynamic fairing to cover it all. The pylon is also designed to prevent a fire in the engine area from spreading to the wing. These multi-functions make the global pylon architecture design highly complex. Existing designs for pylons normally comprise at least two beam-type elements to provide support and couple the engine to the wing of an aircraft, the beam-type elements comprising a bifurcation that defines a trapezoidal bay or space in between. Unlike conventional heat exchangers with a parallelepiped geometry, the heat exchanger according to an embodiment of the first inventive aspect, by virtue of its trapezoidal geometry, take advantage of most of the available space in the pylon bifurcation for maximizing the heat-exchanging performance, being able to cool-down higher amounts of heat in the same environment.

In a third inventive aspect, the invention provides an aircraft comprising a powerplant arrangement according to the second inventive aspect.

All the features described in this specification, including the claims, description and drawings, can be combined in any combination, with the exception of combinations of such mutually exclusive features.

BRIEF DESCRIPTION OF THE DRAWINGS

These and other features and advantages of the invention will be seen more clearly from the following detailed description of a preferred embodiment provided only by way of illustrative and non-limiting example in reference to the attached drawings.

DETAILED DESCRIPTION OF THE PREFERRED EMBODIMENTS

The present invention provides a heat exchanger (10), a powerplant arrangement (20) and an aircraft (30) as described below in relation to the example shown in FIGS. 1-6.

Figure 1:
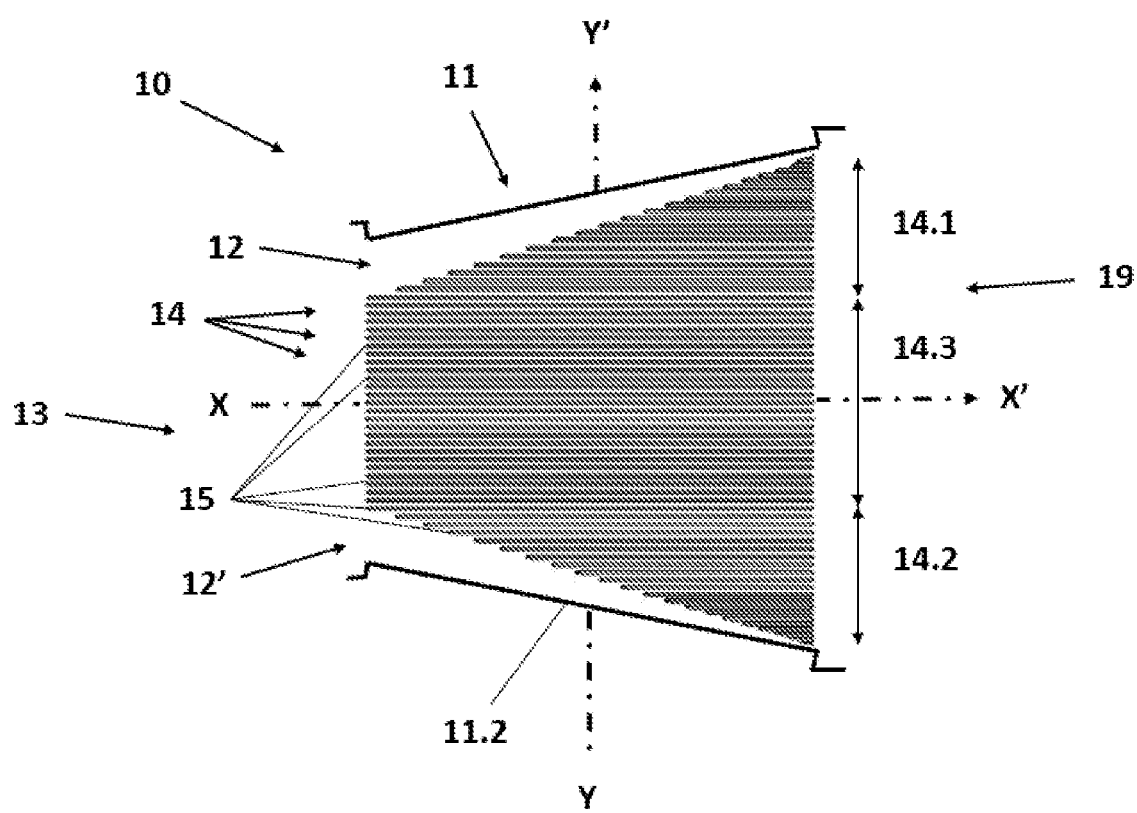
FIG. 1 shows a schematic top cross section view of a heat exchanger according to an embodiment of the invention.

FIG. 1 shows a top plan view of a cross section of a heat exchanger (10) according to an embodiment of the invention. The heat exchanger (10) is arranged along the longitudinal direction X-X' represented as a dashed line. The disposition of the heat exchanger (10) along the direction X-X' implies and should be understood as that the flow of coolant that is provided into the heat exchanger (10) to evacuate heat travels essentially parallel to the direction X-X'. Likewise, as can be seen in FIG. 1, and as will be described below, the main elements of the heat exchanger (10) are arranged essentially parallel to the direction X-X', to favor the movement of the flow of coolant, as well as to maximize the area of contact with the surfaces intended for the evacuation of heat.

The heat exchanger (10) comprises a casing (11) which defines an inner chamber and comprises a first (11.1) and a second (11.2) lateral walls; an inlet (13) configured to be in fluid communication with a source of coolant (not shown); and an outlet (19). The first (11.1) and second (11.2) lateral walls are disposed opposite to each other and extending between the inlet (13) and the outlet (19).

As it can be seen, within the inner chamber, between the first (11.1) and second (11.2) lateral walls a plurality of flat plates (14) are arranged extending parallel to the longitudinal direction X-X'. Each one of the plurality of plates (14) is spaced from one another along a transverse direction Y-Y' represented as a dashed line perpendicular to the longitudinal direction X-X'. A plurality of channels is therefore defined between contiguous plates (14). The plurality of the plates (14) comprise an inner hollow area (not shown in this figure) configured to be in fluidic communication with a source of hot bleed air, so that the hot bleed air flows therethrough.

In an operative mode of the heat exchanger (10), the coolant accesses the inner chamber flowing therethrough, parallel to the longitudinal direction X.X', from the inlet (13) to the outlet (19), bathing both the first (11.1) and second (11.2) lateral walls and all the plates (14) arranged inside the inner chamber in its way. The coolant flow flows through the plurality of channels defined between adjacent plates (14), so that heat transfer between the hot bleed air flowing within the plates (14) and the coolant is performed. In order to reduce the pressure drop at the entry region of the channels, the plurality of plates (14) comprise a leading edge (15) oriented towards the inlet (13) and configured for diverting the incident flow of coolant towards the contiguous channels.

With regard to the coolant that is used to evacuate heat in an operative mode of the heat exchanger (10), in the embodiment of FIG. 1, a source of air bled from the bypass stream flowing through the engine (21) fan duct accesses the inlet (13) of the casing (11) by means of a scoop or manifold (not shown).

As it can be seen, the first (11.1) and second (11.2) lateral walls (11.1, 11.2) of the casing (11) taper outwards along the longitudinal direction X-X', that is, from the inlet (13) to the outlet (19), so that the casing (11) comprises a trapezoidal configuration. By virtue of to this geometric configuration of the casing (11), the heat exchanger (10) can be installed, for example, in a bay of a pylon shaped with a corresponding trapezoidal geometry, allowing to cool-down higher amounts of heat in the same environment with respect to a traditional rectangular geometry.

With the purpose of taking advantage of this trapezoidal geometry of the casing (11) and in order to increase the effective heat exchanging volume, as well as to increase thermal efficiency, the plurality of plates (14) are divided into three groups based on the relative arrangement of their respective leading edges (15) in order to adapt to the trapezoidal geometry of the casing (11).

The leading edges (15) of a first group (14.1) of plates (14) are arranged according to a stepped pattern, such that each leading edge (15) is arranged in a downstream position according to the longitudinal direction X-X' with respect to the inlet (13) and to the leading edge (15) of a contiguous plate (14). In other words, the leading edge (15) of each plate (14) belonging to the first group (14.1) of plates (14) is arranged in a forward location according to the longitudinal direction X-X', that is, further away from the inlet (13) and closer to the outlet (19), with respect to the leading edge (15) of a contiguous plate (14).

As it can be seen, a first gap (12) free of plates (14) is defined between the first group (14.1) of plates (14) and the first lateral wall (11.1), for allowing the coolant to flow between the inlet (13) and the outlet (19) of the casing (11).

Also, the leading edges (15) of a second group (14.2) of plates (14) are arranged according to a stepped pattern, such that each leading edge (15) is arranged in a downstream position according to the longitudinal direction X-X' with respect to the inlet (13) and to the leading edge (15) of a contiguous plate (14). In other words, the leading edge (15) of each plate (14) belonging to the second group (14.2) of plates (14) is arranged in a forward location according to the longitudinal direction X-X', that is, further away from the inlet (13) and closer to the outlet (19), with respect to the leading edge (15) of a contiguous plate (14).

A second gap (12') free of plates (14) is defined between the second group (14.2) of plates (14) and the second lateral wall (11.2), for allowing the coolant to flow between the inlet (13) and the outlet (19) of the casing (11).

As it can be seen, the first gap (12) and the second gap (12') narrow along the longitudinal direction X-X' and have a substantially triangular shape. In other words, the distance between each leading edge (15) of the first (14.1) and second (14.2) group of plates (14) and respective first (11.1) or second (14.2) lateral walls according to the transverse direction Y-Y' decreases along the longitudinal direction X-X', so that the pressure gradient derived from the convergent geometry favors the flow of the coolant through the progressively shorter channels along the direction X-X'.

Also, with the purpose of promoting the cascade flow through successive progressively shorter channels along the longitudinal direction X-X' and maximizing the feeding process of the channels, the leading edges (15) of the plates (14) of the first (14.1) and/or second (14.2) group are arranged with their suction sides oriented towards the corresponding first (11.1) or second (11.2) lateral wall they are facing.

More in particular, the suction side of the leading edges (15) of the first group (14.1) of plates (14) are oriented towards the first gap (12) and thus the first lateral wall (11.1) of the casing (11), and the suction side of the leading edges (15) of the second group (14.2) of plates (14) are oriented towards the second gap (12') and thus the second lateral wall (11.2) of the casing (11).

In a particular example, the leading edges (15) are preferably NACA 4311 airfoils.

Finally, a third group (14.3) of plates (14) is arranged such that the leading edges (15) are aligned with each other according to the transverse direction Y-Y', and wherein the first (14.1) and second (14.2) group of plates (14) are arranged, respectively, on opposite sides of the third group (14.3) of plates (14).

In a particular example, the leading edges (15) of the plates (14) of the third group (14.3) are preferably Eppler E475 airfoils.

Figure 2:
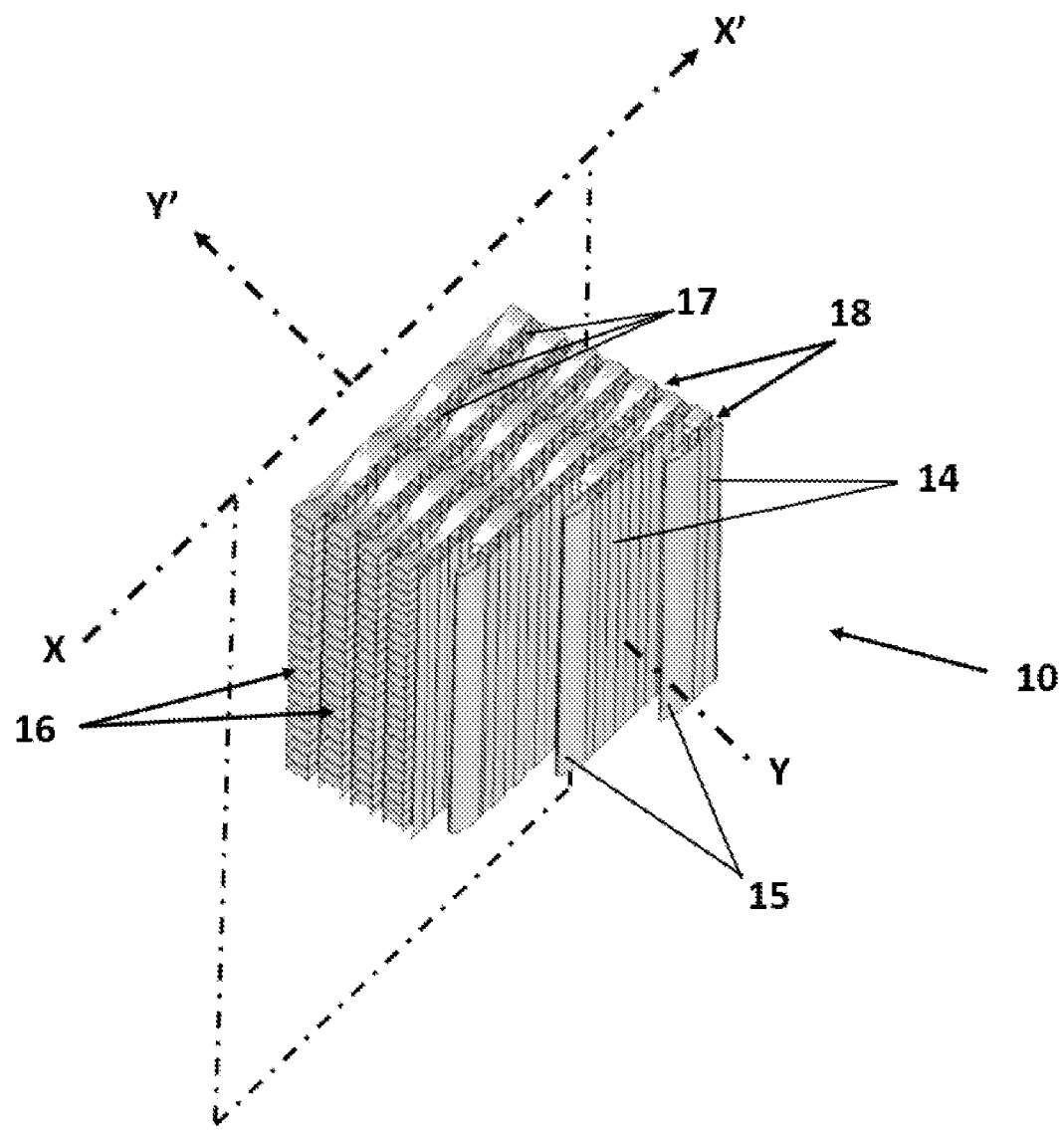
FIG. 2 shows a schematic perspective view of a portion of a heat exchanger according to the invention intersected by a middle plane parallel to the longitudinal direction X-X'.

FIG. 2 shows a top perspective view of a portion of a heat exchanger (10) according to the invention intersected by a middle plane parallel to the longitudinal direction X-X'. In particular, for illustrative purposes, FIG. 2 shows a portion of the embodiment represented in FIG. 1, so as to provide details of the architecture and internal elements arranged in the channels defined between plates (14) and inside the inner hollow area of the plates (14). The architecture and elements of the channels and inner hollow area depicted in FIG. 2 contribute to the optimal distribution of the hot bleed air and coolant, respectively, during operation of the heat exchanger (10).

In particular, it can be seen that the channels defined between contiguous plates (14) comprise a plurality of fins (16) attached by their respective side edges to two contiguous plates (14), the fins (16) extending substantially parallel to the longitudinal direction X-X', being spaced from one another and arranged essentially parallel to each other. Additionally, the fins (16) are shaped with an undulating profile along the longitudinal direction X-X'.

The fins (16) define a plurality of sub-channels along each channel for contributing to guiding the flow of coolant through each channel. Additionally, the undulating geometry of the fins (15) contributes to generating vorticity, improving the heat-exchanging performance along each channel thereby.

The ratio between the width of the fins (16) and the width of each of the plurality of plates (14) according to the transverse direction Y-Y' of the embodiment shown is 2, which provides the optimal relationship between the pressure drop and the necessary effective area for the heat-exchanging performance.

In the same way that occurs with the channels and the fins (16) arranged within them along their longitudinal length, and with the same purpose of optimizing the flow of hot bleed air along the inner hollow chamber, it can be seen that the inner hollow area of each of the plates (14) comprises a plurality of walls (17) spaced from one another along the longitudinal direction X-X', a plurality of inner hollow ducts (18) being defined thereby.

Figure 3:
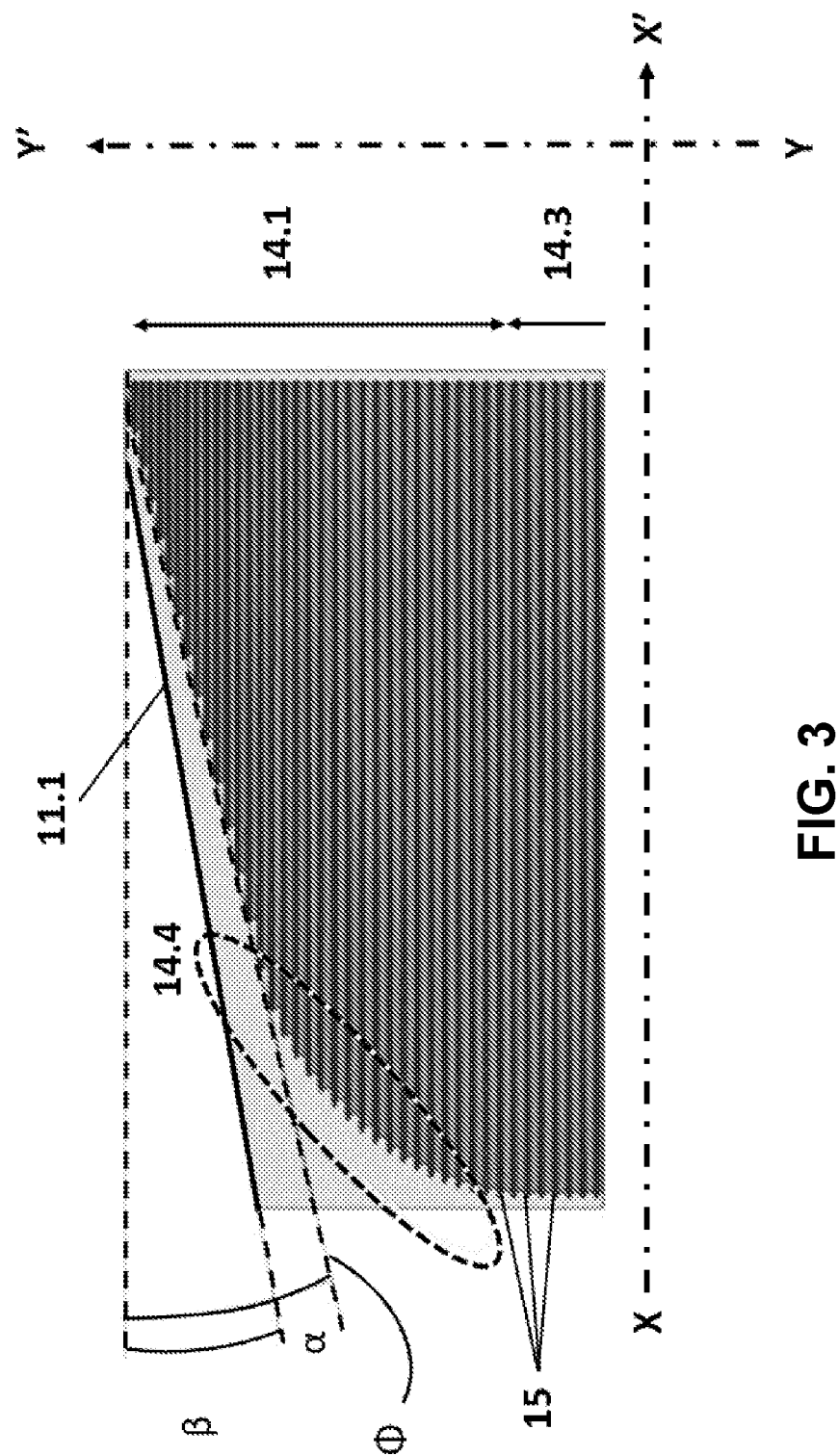
FIG. 3 shows a schematic top cross section view of a portion of a heat exchanger according to an embodiment of the invention.

FIG. 3 shows a top plan view of a cross section view of a portion of a heat exchanger (10) according to an embodiment of the invention. In particular, FIG. 3 provides details of a specific example of the distribution and relative position of the leading edges (15) of the first group (14.1) of plates (14) with respect to the first lateral wall (11.1).

In particular, it can be seen that the first lateral wall (11.1) of the casing (11) is substantially flat and forms a first angle β with the longitudinal direction X-X'. Preferably, the first lateral wall (11.1) forms an angle of about 11.7 degrees with the longitudinal direction X-X'.

In turn, a plurality of the leading edges (15) of the first group (14.1) of plates (14) facing the first lateral wall (11.1) are arranged bounded by a substantially flat plane (Φ) which forms an angle α with the longitudinal direction X-X'; the angle α being greater than β.

Indeed, it can be seen that the flat plane (Φ), which despite being shown for illustrative purposes, has no real physical entity (i.e., is a virtual geometric reference), is tangent to a plurality of leading edges (15). In an example, values for the second angle α are 12.5, 15 and 17.5 degrees.

According to the preferred examples indicated above for both angles (that is, in the case that β is about 11.7 degrees and α is about one value selected among 12.5, 15 and 17.5 degrees), the difference between the angles (α–β) is preferably 5.8, 3.3 or 1.3 degrees.

Finally, it can be seen that a plurality of the leading edges (15) of the first group (14.1) adjacent to the third group (14) of plates (14), are arranged bounded by a cylindrical surface (14.4). In other words, there is a virtual geometric reference (that is, without real physical entity) that rests tangentially on the plurality of the leading edges (15) of the first group (14.1) of plates (14) and which describes a conical curve according to the top plan view provided in FIG. 3.

Advantageously, the plurality of leading edges (15) bounded by a cylindrical surface (14.4) contribute to smoothing the aerodynamic transition between the third group (14.3) of plates (14) and the first group (14.1) of plates (14), improving the feed process of the involved channels and minimizing the pressure drop thereby.

Figure 4:
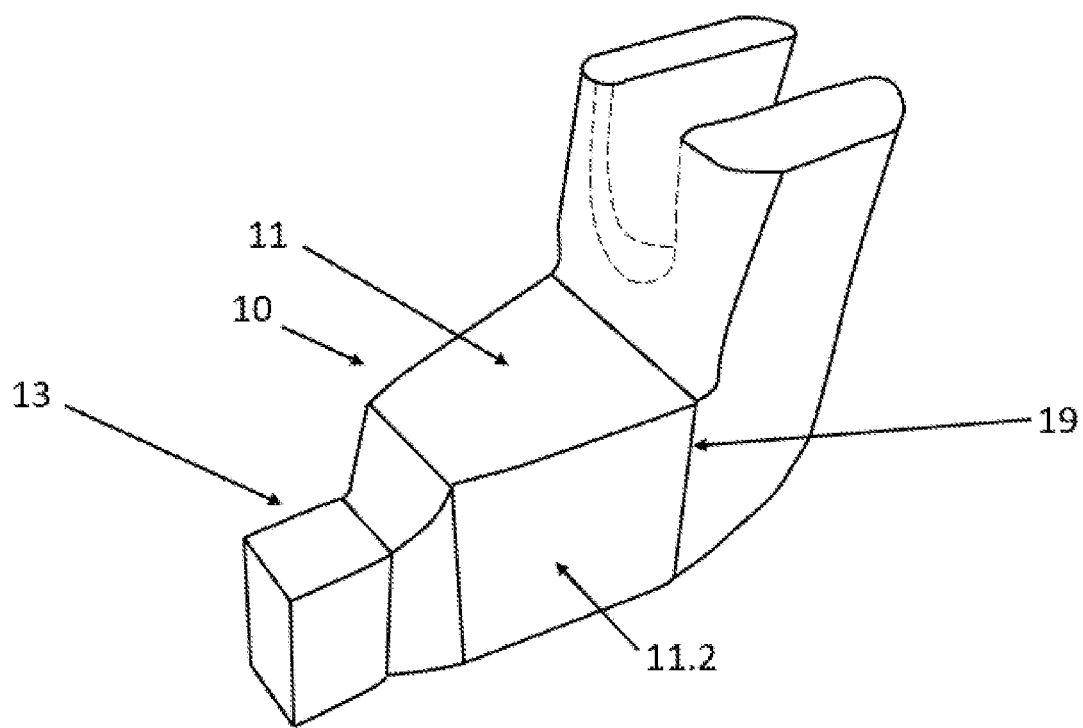
FIG. 4 shows a schematic perspective view of a heat exchanger with a trapezoidal shape according to the invention.

FIG. 4 shows a schematic perspective view of a heat exchanger (10) with a trapezoidal shape according to the invention, the heat exchanger (10) being coupled, in an operational configuration, to additional elements of the hot air bleed system of an aircraft (30). In particular, it is coupled on its front part, that is, in the part corresponding to the inlet (13) through which the coolant accesses the inner chamber of the casing (11). The heat exchanger (10) it is also coupled on its rear part, that is, the part corresponding to the outlet (19) through which the coolant exits the inner chamber of the casing (11) at a higher temperature after being used to evacuate heat from the hot bleed air.

In a particular embodiment, the inlet (13) of the casing (11) is coupled to a frontal scoop for establishing a fluidic communication with a source of air bled from the fan, in order to maximize the cooling flow through the inner chamber of the casing (11).

Advantageously, an embodiment of a heat exchanger (10) comprising a casing (11) with a trapezoidal configuration such as the one shown in FIG. 4, can be installed in a bay of a pylon (22) shaped with a corresponding trapezoidal geometry, taking advantage of all the available space and allowing to cool-down higher amounts of heat in the same environment with respect to a traditional heat exchanger (10) with a rectangular geometry.

Figure 5:
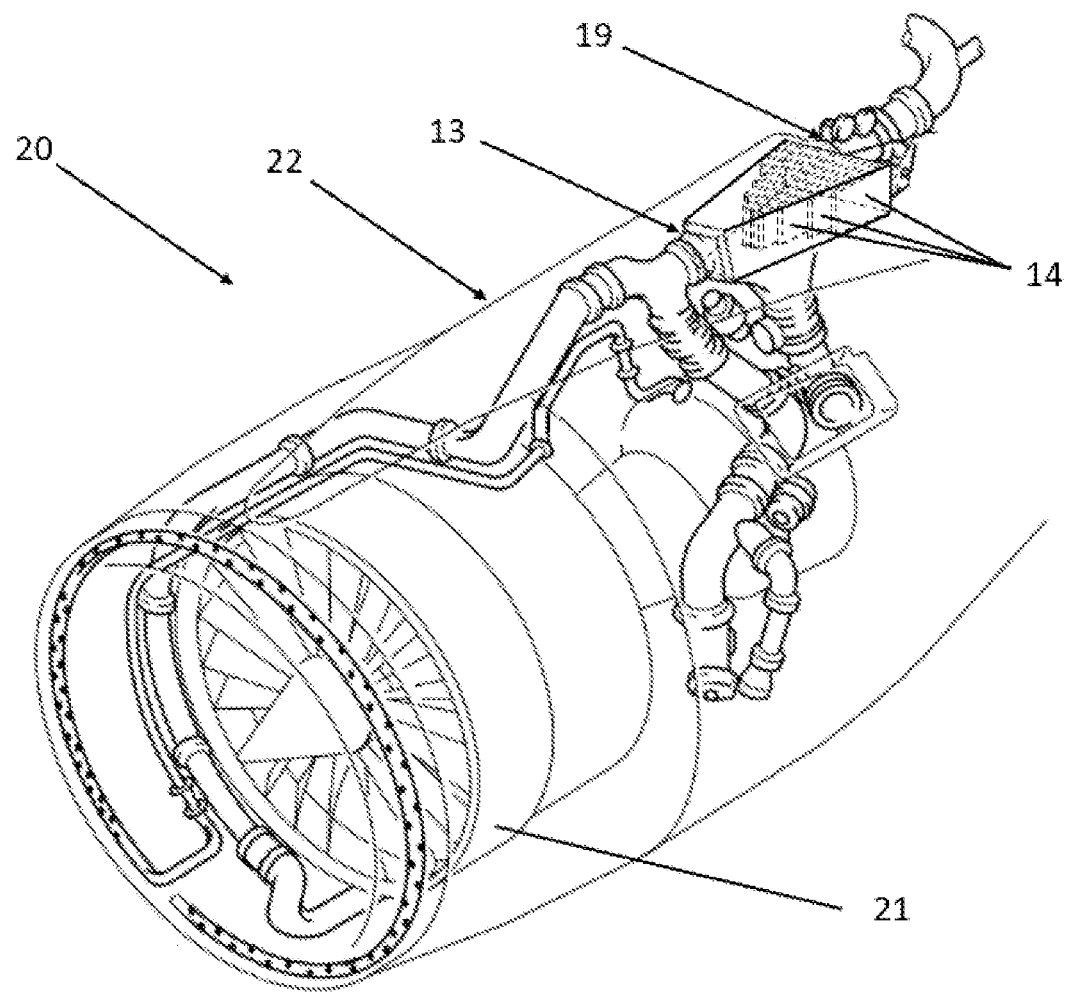
FIG. 5 shows an embodiment of a powerplant arrangement comprising a heat exchanger according to the invention.

FIG. 5 shows an embodiment of a powerplant arrangement (20). In particular, the powerplant arrangement (20) comprises an engine (21), a pylon (22) configured for coupling the engine (21) to the wing of an aircraft (30) and the heat exchanger (10) according to an embodiment of the invention. A vast majority of current pylons (22) installed comprise at least two beam-type elements to provide support and couple the engine (21) to the wing of an aircraft (30), the beam-type elements comprising a bifurcation that defines a trapezoidal bay or space in between. Unlike conventional heat exchangers (10) with a parallelepiped geometry, the heat exchanger (10) shown in FIG. 5, by virtue of its trapezoidal geometry, take advantage of most of the available space in the pylon (22) bifurcation for maximizing the heat-exchanging performance, being able to cool-down higher amounts of heat in the same environment.

Figure 6:
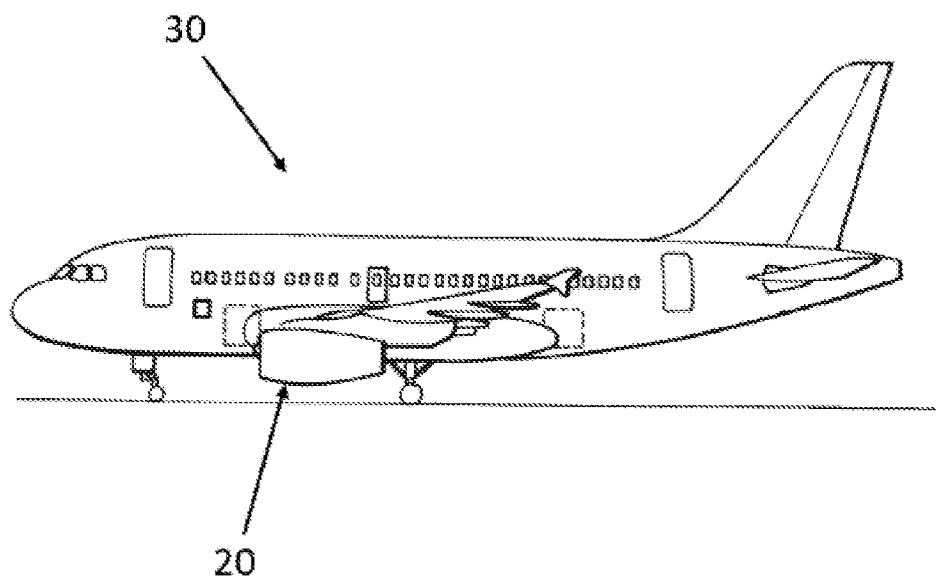
FIG. 6 shows an embodiment of an aircraft comprising a powerplant arrangement according to the invention.

FIG. 6 shows an embodiment of an aircraft (30) comprising a powerplant arrangement (20) according to the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A heat exchanger for an aircraft, the heat exchanger arranged along a longitudinal direction X-X' and comprising:

a casing defining an inner chamber and comprising an inlet, an outlet and a first and second lateral walls opposite each other and extending between the inlet and the outlet; the casing being configured to be in fluid communication with a source of incident flow of coolant through the inlet so that, in an operative mode of the heat exchanger, a flow of coolant flows through the inner chamber from the inlet to the outlet following the longitudinal direction X-X';

a plurality of plates housed in the inner chamber of the casing extending substantially parallel to the longitudinal direction X-X', each of the plurality of plates being spaced from each other between the first lateral wall and the second lateral wall along a transverse direction Y-Y' perpendicular to the longitudinal direction X-X'; and a plurality of channels defined between contiguous plates of the plurality of plates;

wherein each of the plurality of plates comprises a leading edge oriented towards the inlet and configured for diverting the incident flow of coolant towards contiguous channels of the plurality of channels;

wherein two or more plate of the plurality of the plates comprise an inner hollow area configured to be in fluidic communication with a source of hot bleed air and to conduct a flow of the hot bleed air from the source of hot bleed air therethrough in the operative mode of the heat exchanger;

wherein the plurality of plates comprises a first group of plates, a second group of plates, and a third group of plates;
wherein leading edges of a first group of plates are arranged according to a stepped pattern, such that each leading edge is arranged in a downstream position according to the longitudinal direction X-X' with respect to the inlet and to the leading edge of a contiguous plate of a first group of plates;
wherein the heat exchanger further comprises a first gap defined between the first group of plates and the first lateral wall of the casing, so that the first gap allows to establish a fluid communication of the coolant through the first group of plates between the inlet and the outlet of the casing; and
wherein a distance between each leading edge of the first group of plates and the first lateral wall according to the transverse direction Y-Y' decreases along the longitudinal direction X-X'.

2. The heat exchanger according to claim 1,
wherein leading edges of the second group of plates are arranged according to a stepped pattern as for the first group of plates;
wherein the heat exchanger further comprises a second gap defined between the second group of plates and the second lateral wall of the casing, so that the second gap allows to establish a fluid communication of the coolant through the second group of plates between the inlet and the outlet of the casing; and
wherein the distance between each leading edge of the second group of plates to the second lateral wall according to the transverse direction Y-Y' decreases along the longitudinal direction X-X'.

3. The heat exchanger according to claim 2,
wherein the third group of plates is arranged such that leading edges of the plates of the third group are aligned with each other according to the transverse direction Y-Y', and
wherein the first and second group of plates are arranged, respectively, on opposite sides of the third group of plates.

4. The heat exchanger according to claim 3, wherein at least one of:
the leading edges of the plates of at least one of the first or second group are arranged with suction sides oriented towards the first or second gap, the leading edges of the plates of at least one of the first or second group being NACA 4311 airfoils; or
the leading edges of the plates of the third group are Eppler E475 airfoils.

5. The heat exchanger according to claim 2, wherein the first and the second lateral walls of the casing taper outwards from the inlet and the outlet, so that the casing comprises a trapezoidal configuration.

6. The heat exchanger according to claim 5,
wherein at least one of the first or second lateral walls of the casing is substantially flat and forms a first angle with the longitudinal direction X-X';
wherein a plurality of the leading edges of the first or second group of plates adjacent to the corresponding first or second lateral wall are arranged bounded by a substantially flat plane; and
wherein said plane forms a second angle with the longitudinal direction X-X'; and
wherein the second angle is greater than the first angle.

7. The heat exchanger according to claim 6, wherein a difference between the first and second angles is in a range between 5.8 degrees and 1.3 degrees.

8. The heat exchanger according to claim 7, wherein the difference between the first and second angles is 5.8 degrees.

9. The heat exchanger according to claim 7, wherein the difference between the first and second angles is 3.3 degrees.

10. The heat exchanger according to claim 7, wherein the difference between the first and second angles is 1.3 degrees.

11. The heat exchanger according to claim 7,
wherein the third group of plates is arranged such that leading edges of the third group of plates are aligned with each other according to the transverse direction Y-Y', and
wherein the first and second group of plates are arranged, respectively, on opposite sides of the third group of plates; and
wherein at least one of:
a plurality of the leading edges, of the first group of plates are arranged bounded by a cylindrical surface, or
a plurality of the leading edges of the second group of plates, adjacent to the third group of plates, are arranged bounded by a cylindrical surface.

12. The heat exchanger according to claim 1,
wherein at least one of the channels comprises a plurality of fins attached by respective side edges to two contiguous plates of the plurality of plates,
wherein said fins extend substantially parallel to the longitudinal direction X-X' through the channels;
wherein for each channel the fins are spaced from one another according to a direction perpendicular to the longitudinal direction X-X' and transversal direction Y-Y' and are arranged parallel to each other.

13. The heat exchanger according to claim 12, wherein a ratio between a width of the fins and a width of each of the plurality of plates according to the transverse direction Y-Y' is one selected in a range between 1.5 and 2.5.

14. The heat exchanger according to claim 12, wherein the fins are shaped with an undulating profile along the longitudinal direction X-X'.

15. The heat exchanger according to claim 1, wherein the inner hollow area of at least one plate comprises inside a plurality of walls spaced from one another along the longitudinal direction X-X' from the leading edge of the plurality of plates towards the outlet of the casing, a plurality of inner hollow ducts being defined thereby.

16. The heat exchanger according to claim 1, wherein the casing further comprises a manifold configured for establishing a fluidic communication with the source of air bled from a bypass stream flowing through an engine fan duct and to conduct a flow of the hot bleed air therethrough in the operative mode of the heat exchanger.

17. A powerplant arrangement comprising
an engine,
a pylon configured for coupling the engine to a wing of an aircraft, and
a heat exchanger according to claim 1,
wherein the heat exchanger is arranged in a bay of the pylon shaped with a trapezoidal geometry.

18. An aircraft comprising a powerplant arrangement according to claim 17.

* * * * *